United States Patent
Bailor et al.

(10) Patent No.: US 8,346,768 B2
(45) Date of Patent: *Jan. 1, 2013

(54) FAST MERGE SUPPORT FOR LEGACY DOCUMENTS

(75) Inventors: Jonathan B. Bailor, Bellevue, WA (US); David B. Robins, Duvall, WA (US)

(73) Assignee: Microsoft Corporation, Redmond, WA (US)

(*) Notice: Subject to any disclaimer, the term of this patent is extended or adjusted under 35 U.S.C. 154(b) by 496 days.

This patent is subject to a terminal disclaimer.

(21) Appl. No.: 12/432,817

(22) Filed: Apr. 30, 2009

(65) Prior Publication Data

US 2010/0281074 A1    Nov. 4, 2010

(51) Int. Cl.
*G06F 17/30* (2006.01)
*G06F 17/00* (2006.01)
*G06F 15/16* (2006.01)

(52) U.S. Cl. ........ 707/729; 707/707; 707/731; 715/253; 715/277; 709/203

(58) Field of Classification Search .......... 709/203–205, 709/215–220; 715/234, 229, 744, 751, 753, 715/758, 759, 253, 277; 704/1, 7–10; 707/609–617, 707/656, 705–707, 737–738, 802, 821–822, 707/828–829, 728–731

See application file for complete search history.

(56) References Cited

U.S. PATENT DOCUMENTS

| | | |
|---|---|---|
| 4,855,580 A | 8/1989 | Van Maanen, Jr. |
| 5,107,443 A | 4/1992 | Smith et al. |
| 5,142,619 A | 8/1992 | Webster, III |
| 5,313,394 A | 5/1994 | Clapp |
| 5,339,389 A | 8/1994 | Bates et al. |
| 5,446,842 A | 8/1995 | Schaeffer |
| 5,486,686 A | 1/1996 | Zdybel, Jr. et al. |
| 5,535,332 A | 7/1996 | Ishida |
| 5,568,640 A * | 10/1996 | Nishiyama et al. ........... 1/1 |
| 5,623,659 A | 4/1997 | Shi et al. |
| 5,630,138 A | 5/1997 | Raman |
| 5,664,186 A | 9/1997 | Bennett et al. |

(Continued)

FOREIGN PATENT DOCUMENTS

CN    1276568 A    12/2000

(Continued)

OTHER PUBLICATIONS

Eric Badouel et al. "Merging Hierarchically-Structured Documents in Workflow Systems", Electronic Notes in Theoretical Computer Science 203 (2008) 3-24.*

(Continued)

*Primary Examiner* — Srirama Channavajjala
(74) *Attorney, Agent, or Firm* — Merchant & Gould (57) ABSTRACT

A method is presented for merging document metadata at a client computer. A document obtained from a server computer is opened by a user at the client computer. If the document does not include paragraph identifiers, a paragraph identifier is assigned to each paragraph in the document. When the document is opened by a second user at a second client computer, metadata for the document is received from the server computer. A determination is made whether to merge the metadata received from the server computer with current metadata for the document. When it is determined that the current metadata and the metadata received from the server computer should be merged, paragraph identifiers are adjusted in the document based on the metadata received from the server computer.

13 Claims, 6 Drawing Sheets

U.S. PATENT DOCUMENTS

| | | | |
|---|---|---|---|
| 5,671,428 A | 9/1997 | Muranaga et al. | |
| 5,692,178 A | 11/1997 | Shaughnessy | |
| 5,729,734 A | 3/1998 | Parker et al. | |
| 5,751,958 A | 5/1998 | Zweben et al. | |
| 5,781,732 A | 7/1998 | Adams | |
| 5,781,908 A | 7/1998 | Williams et al. | |
| 5,787,262 A | 7/1998 | Shakib et al. | |
| 5,835,950 A | 11/1998 | Cho et al. | |
| 5,963,931 A | 10/1999 | Fagg, III et al. | |
| 6,000,945 A | 12/1999 | Sanchez-Lazer et al. | |
| 6,006,239 A | 12/1999 | Bhansali et al. | |
| 6,026,461 A | 2/2000 | Baxter et al. | |
| 6,055,546 A | 4/2000 | Pongracz et al. | |
| 6,065,026 A | 5/2000 | Cornelia et al. | |
| 6,067,551 A | 5/2000 | Brown et al. | |
| 6,073,161 A | 6/2000 | DeBoskey et al. | |
| 6,088,702 A | 7/2000 | Plantz et al. | |
| 6,202,085 B1 | 3/2001 | Benson et al. | |
| 6,209,010 B1 | 3/2001 | Gauthier et al. | |
| 6,209,128 B1 | 3/2001 | Gerard et al. | |
| 6,240,414 B1 | 5/2001 | Beizer et al. | |
| 6,244,575 B1 * | 6/2001 | Vaartstra et al. | 261/141 |
| 6,275,935 B1 | 8/2001 | Barlow et al. | |
| 6,317,777 B1 | 11/2001 | Skarbo et al. | |
| 6,324,544 B1 | 11/2001 | Alam et al. | |
| 6,327,584 B1 | 12/2001 | Xian et al. | |
| 6,327,611 B1 | 12/2001 | Everingham | |
| 6,341,291 B1 | 1/2002 | Bentley et al. | |
| 6,342,906 B1 | 1/2002 | Kumar et al. | |
| 6,363,352 B1 | 3/2002 | Dailey et al. | |
| 6,411,965 B2 | 6/2002 | Klug | |
| 6,430,576 B1 | 8/2002 | Gates et al. | |
| 6,438,548 B1 | 8/2002 | Grim, III et al. | |
| 6,438,563 B1 | 8/2002 | Kawagoe | |
| 6,438,564 B1 | 8/2002 | Morton et al. | |
| 6,446,093 B2 | 9/2002 | Tabuchi | |
| 6,502,113 B1 | 12/2002 | Crawford et al. | |
| 6,526,434 B1 | 2/2003 | Carlson et al. | |
| 6,529,905 B1 | 3/2003 | Bray et al. | |
| 6,560,614 B1 | 5/2003 | Barboy et al. | |
| 6,560,620 B1 | 5/2003 | Ching | |
| 6,574,377 B1 | 6/2003 | Cahill et al. | |
| 6,610,104 B1 | 8/2003 | Lin | |
| 6,662,209 B2 | 12/2003 | Potts, Jr. et al. | |
| 6,681,371 B1 | 1/2004 | Devanbu | |
| 6,681,382 B1 | 1/2004 | Kakumani et al. | |
| 6,687,878 B1 | 2/2004 | Eintracht et al. | |
| 6,711,718 B2 | 3/2004 | Pfeil et al. | |
| 6,751,618 B1 | 6/2004 | Germscheid et al. | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato et al. | |
| 6,760,840 B1 | 7/2004 | Shimbo et al. | |
| 6,772,165 B2 | 8/2004 | O'Carroll | |
| 6,842,768 B1 | 1/2005 | Shaffer et al. | |
| 6,854,087 B1 | 2/2005 | Takeo et al. | |
| 6,925,476 B1 | 8/2005 | Multer | |
| 6,976,213 B1 * | 12/2005 | Letourneau et al. | 715/234 |
| 6,983,416 B1 * | 1/2006 | Bae et al. | 715/234 |
| 6,993,522 B2 | 1/2006 | Chen et al. | |
| 7,007,235 B1 | 2/2006 | Hussein et al. | |
| 7,024,429 B2 | 4/2006 | Ngo et al. | |
| 7,024,430 B1 | 4/2006 | Ingraham et al. | |
| 7,035,839 B1 * | 4/2006 | Gillespie et al. | 1/1 |
| 7,039,679 B2 | 5/2006 | Mendez et al. | |
| 7,047,407 B2 | 5/2006 | Itoh et al. | |
| 7,053,839 B2 | 5/2006 | Cassel et al. | |
| 7,058,663 B2 | 6/2006 | Johnston et al. | |
| 7,065,633 B1 | 6/2006 | Yates, Jr. et al. | |
| 7,069,505 B2 | 6/2006 | Tamano | |
| 7,089,278 B1 | 8/2006 | Churchill et al. | |
| 7,110,936 B2 | 9/2006 | Hiew et al. | |
| 7,111,237 B2 | 9/2006 | Chan | |
| 7,124,151 B1 | 10/2006 | Choi | |
| 7,124,362 B2 | 10/2006 | Tischer | |
| 7,127,501 B1 | 10/2006 | Beir et al. | |
| 7,149,776 B1 | 12/2006 | Roy et al. | |
| 7,155,465 B2 | 12/2006 | Lee et al. | |
| 7,185,277 B1 | 2/2007 | Bernstein et al. | |
| 7,200,668 B2 | 4/2007 | Mak et al. | |
| 7,203,708 B2 | 4/2007 | Liu et al. | |
| 7,209,948 B2 | 4/2007 | Srinivasa | |
| 7,225,189 B1 | 5/2007 | McCormack et al. | |
| 7,240,091 B1 | 7/2007 | Hopmann et al. | |
| 7,249,314 B2 | 7/2007 | Walker et al. | |
| 7,293,049 B2 | 11/2007 | Kadyk et al. | |
| 7,310,657 B2 | 12/2007 | Nakamura | |
| 7,315,978 B2 | 1/2008 | Giles | |
| 7,328,243 B2 | 2/2008 | Yeager et al. | |
| 7,346,705 B2 | 3/2008 | Hullot et al. | |
| 7,401,291 B2 | 7/2008 | Ramaley et al. | |
| 7,496,577 B2 | 2/2009 | Williamson et al. | |
| 7,529,780 B1 | 5/2009 | Braginsky et al. | |
| 7,536,641 B2 | 5/2009 | Rosenstein et al. | |
| 7,565,603 B1 * | 7/2009 | Jones et al. | 715/236 |
| 7,577,906 B2 | 8/2009 | Friedrichowitz et al. | |
| 7,594,163 B2 | 9/2009 | Slack-Smith | |
| 7,603,357 B1 | 10/2009 | Gourdol et al. | |
| 7,610,287 B1 | 10/2009 | Dean et al. | |
| 7,647,292 B2 | 1/2010 | Hayashi | |
| 7,650,336 B1 | 1/2010 | Herrmann et al. | |
| 7,664,750 B2 | 2/2010 | Frees et al. | |
| 7,694,217 B2 | 4/2010 | Croft et al. | |
| 7,714,222 B2 | 5/2010 | Taub et al. | |
| 7,761,784 B2 | 7/2010 | Parks et al. | |
| 7,779,347 B2 | 8/2010 | Christiansen et al. | |
| 7,788,326 B2 | 8/2010 | Buchheit et al. | |
| 7,792,788 B2 | 9/2010 | Melmon et al. | |
| 7,801,951 B2 | 9/2010 | Fishkin et al. | |
| 7,839,532 B2 | 11/2010 | Brawn et al. | |
| 7,912,811 B2 | 3/2011 | Hodel-Widmer | |
| 7,941,399 B2 * | 5/2011 | Bailor et al. | 707/608 |
| 7,962,853 B2 | 6/2011 | Bedi et al. | |
| 7,966,556 B1 | 6/2011 | Bourdev | |
| 8,019,780 B1 * | 9/2011 | Pinkerton et al. | 707/783 |
| 8,028,229 B2 | 9/2011 | Bailor et al. | |
| 2001/0018697 A1 | 8/2001 | Kunitake et al. | |
| 2001/0042075 A1 | 11/2001 | Tabuchi | |
| 2002/0007287 A1 | 1/2002 | Straube et al. | |
| 2002/0022122 A1 | 2/2002 | Hirata et al. | |
| 2002/0065848 A1 | 5/2002 | Walker et al. | |
| 2002/0069192 A1 | 6/2002 | Aegerter | |
| 2002/0188598 A1 * | 12/2002 | Myllymaki | 707/2 |
| 2003/0028600 A1 | 2/2003 | Parker | |
| 2003/0093760 A1 | 5/2003 | Suzuki et al. | |
| 2003/0097410 A1 | 5/2003 | Atkins et al. | |
| 2003/0097638 A1 | 5/2003 | Tamano | |
| 2003/0115481 A1 | 6/2003 | Baird et al. | |
| 2003/0140067 A1 | 7/2003 | Sesek et al. | |
| 2003/0159105 A1 | 8/2003 | Hiebert | |
| 2003/0167281 A1 | 9/2003 | Cohen et al. | |
| 2003/0172113 A1 | 9/2003 | Cameron et al. | |
| 2003/0172168 A1 * | 9/2003 | Mak et al. | 709/230 |
| 2003/0208534 A1 | 11/2003 | Carmichael | |
| 2004/0039829 A1 | 2/2004 | Bucher | |
| 2004/0068505 A1 | 4/2004 | Lee et al. | |
| 2004/0107224 A1 | 6/2004 | Bera | |
| 2004/0122870 A1 | 6/2004 | Park et al. | |
| 2004/0122898 A1 | 6/2004 | Srinivasa | |
| 2004/0122912 A1 * | 6/2004 | Kim et al. | 709/217 |
| 2004/0133858 A1 | 7/2004 | Barnett et al. | |
| 2004/0143630 A1 | 7/2004 | Kaufmann et al. | |
| 2004/0172395 A1 | 9/2004 | Edelstein et al. | |
| 2004/0177343 A1 | 9/2004 | McVoy et al. | |
| 2004/0199550 A1 | 10/2004 | Ito et al. | |
| 2004/0205539 A1 | 10/2004 | Mak et al. | |
| 2004/0205653 A1 | 10/2004 | Hadfield et al. | |
| 2004/0230903 A1 | 11/2004 | Elza et al. | |
| 2004/0239700 A1 | 12/2004 | Baschy | |
| 2004/0243644 A1 | 12/2004 | Steere et al. | |
| 2005/0004990 A1 | 1/2005 | Durazo et al. | |
| 2005/0022122 A1 | 1/2005 | Barrus et al. | |
| 2005/0033811 A1 * | 2/2005 | Bhogal et al. | 709/206 |
| 2005/0064858 A1 | 3/2005 | Makela et al. | |
| 2005/0071386 A1 | 3/2005 | Wolfgang et al. | |
| 2005/0097440 A1 | 5/2005 | Lusk et al. | |

| Publication No. | Date | Inventor |
|---|---|---|
| 2005/0177617 A1 | 8/2005 | Banginwar et al. |
| 2005/0198132 A1 | 9/2005 | Vellante et al. |
| 2005/0203962 A1 | 9/2005 | Zhou et al. |
| 2005/0210392 A1 | 9/2005 | Koide et al. |
| 2005/0216524 A1 | 9/2005 | Gomes et al. |
| 2005/0223066 A1 | 10/2005 | Buchheit et al. |
| 2005/0234943 A1 | 10/2005 | Clarke |
| 2005/0240858 A1 | 10/2005 | Croft et al. |
| 2005/0251738 A1* | 11/2005 | Hirano et al. ............ 715/514 |
| 2005/0256907 A1 | 11/2005 | Novik et al. |
| 2005/0262203 A1 | 11/2005 | Buchheit et al. |
| 2005/0289512 A1 | 12/2005 | Matsusaka |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0031264 A1 | 2/2006 | Bosworth et al. |
| 2006/0041596 A1 | 2/2006 | Stirbu et al. |
| 2006/0047656 A1* | 3/2006 | Dehlinger et al. ............ 707/6 |
| 2006/0053194 A1 | 3/2006 | Schneider et al. |
| 2006/0053195 A1 | 3/2006 | Schneider et al. |
| 2006/0080432 A1 | 4/2006 | Spataro et al. |
| 2006/0085402 A1 | 4/2006 | Brown et al. |
| 2006/0101328 A1 | 5/2006 | Albornoz et al. |
| 2006/0106879 A1 | 5/2006 | Zondervan et al. |
| 2006/0123033 A1 | 6/2006 | Livshits |
| 2006/0136511 A1 | 6/2006 | Ngo et al. |
| 2006/0136809 A1 | 6/2006 | Fernstrom |
| 2006/0200755 A1 | 9/2006 | Melmon et al. |
| 2006/0218476 A1 | 9/2006 | Gombert |
| 2006/0242549 A1 | 10/2006 | Schwier et al. |
| 2006/0248038 A1 | 11/2006 | Kaplan et al. |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0066293 A1 | 3/2007 | Peng et al. |
| 2007/0118598 A1 | 5/2007 | Bedi et al. |
| 2007/0118794 A1 | 5/2007 | Hollander et al. |
| 2007/0130334 A1 | 6/2007 | Carley |
| 2007/0156672 A1 | 7/2007 | Wolff et al. |
| 2007/0186157 A1 | 8/2007 | Walker et al. |
| 2007/0186171 A1 | 8/2007 | Junuzovic et al. |
| 2007/0198952 A1 | 8/2007 | Pittenger |
| 2007/0203917 A1 | 8/2007 | Du et al. |
| 2007/0226320 A1 | 9/2007 | Hager et al. |
| 2007/0226604 A1 | 9/2007 | Chalasani et al. |
| 2007/0271502 A1 | 11/2007 | Bedi et al. |
| 2007/0283321 A1 | 12/2007 | Hedge et al. |
| 2008/0028300 A1 | 1/2008 | Krieger et al. |
| 2008/0059187 A1* | 3/2008 | Roitblat et al. ............ 704/257 |
| 2008/0059539 A1 | 3/2008 | Chin et al. |
| 2008/0072141 A1 | 3/2008 | Hodel-Widmer |
| 2008/0086718 A1 | 4/2008 | Bostick et al. |
| 2008/0097993 A1 | 4/2008 | Nanba |
| 2008/0098294 A1 | 4/2008 | Le |
| 2008/0114740 A1 | 5/2008 | Vergottini |
| 2008/0126953 A1 | 5/2008 | Davidson et al. |
| 2008/0147590 A1 | 6/2008 | Bechtel et al. |
| 2008/0177782 A1 | 7/2008 | Poston |
| 2008/0180740 A1* | 7/2008 | Kimura et al. ............ 358/1.15 |
| 2008/0195800 A1 | 8/2008 | Lee et al. |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1* | 10/2008 | Vailaya et al. ............ 707/6 |
| 2008/0270386 A1 | 10/2008 | Ohi et al. |
| 2008/0294895 A1 | 11/2008 | Bodner et al. |
| 2008/0320384 A1* | 12/2008 | Nagarajan ............ 715/255 |
| 2009/0006936 A1 | 1/2009 | Parker et al. |
| 2009/0006946 A1 | 1/2009 | Hanson |
| 2009/0006948 A1 | 1/2009 | Parker et al. |
| 2009/0063489 A1 | 3/2009 | Neumann et al. |
| 2009/0094231 A1* | 4/2009 | Marvit et al. ............ 707/5 |
| 2009/0094242 A1 | 4/2009 | Lo et al. |
| 2009/0125518 A1 | 5/2009 | Bailor et al. |
| 2009/0157811 A1 | 6/2009 | Bailor et al. |
| 2009/0171987 A1 | 7/2009 | Coppinger et al. |
| 2009/0193331 A1 | 7/2009 | Croft et al. |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0271696 A1 | 10/2009 | Bailor et al. |
| 2009/0282041 A1 | 11/2009 | Skaria et al. |
| 2009/0282462 A1 | 11/2009 | Skaria et al. |
| 2009/0327294 A1 | 12/2009 | Bailor et al. |
| 2010/0023562 A1* | 1/2010 | Kreuch et al. ............ 707/203 |
| 2010/0070464 A1 | 3/2010 | Aymeloglu et al. |
| 2010/0088676 A1 | 4/2010 | Yuan et al. |
| 2010/0095198 A1 | 4/2010 | Bultrowicz et al. |
| 2010/0131836 A1 | 5/2010 | Dukhon et al. |
| 2010/0278453 A1 | 11/2010 | King |
| 2011/0055702 A1* | 3/2011 | Jakobson ............ 715/723 |
| 2011/0184906 A1 | 7/2011 | Bailor et al. |
| 2012/0254315 A1 | 10/2012 | Skaria et al. |
| 2012/0278276 | 11/2012 | Bailor et al. |

FOREIGN PATENT DOCUMENTS

| | | |
|---|---|---|
| CN | 1804836 | 7/2006 |
| CN | 101042702 A | 9/2007 |
| DE | 198 44 071 A1 | 4/1999 |
| EP | 1 132 847 A2 | 9/2001 |
| EP | 1 290 575 B1 | 6/2005 |
| EP | 1 681 652 A2 | 7/2006 |
| JP | 2005310158 A | 11/2005 |
| KR | 10-0331685 B1 | 4/2002 |
| KR | 10-2006-0047218 A | 5/2006 |
| RU | 2 250 492 C2 | 4/2005 |
| RU | 50 695 U1 | 1/2006 |
| TW | 200424868 A | 11/2004 |
| TW | 200627259 A | 8/2006 |
| WO | WO 01/25986 * | 4/2001 |
| WO | WO 01/25986 A2 | 4/2001 |
| WO | WO 01/33362 A1 | 5/2001 |
| WO | WO 01/88750 * | 11/2001 |
| WO | WO 02/33575 A2 | 4/2002 |
| WO | WO 2005/114467 A2 | 12/2005 |
| WO | WO 2007/034858 A1 | 3/2007 |
| WO | WO 2007/062949 A1 | 6/2007 |
| WO | WO 2009/061638 A1 | 5/2009 |
| WO | WO 2009/076010 A1 | 6/2009 |
| WO | WO 2009/079116 A2 | 6/2009 |
| WO | WO 2009/134548 A2 | 11/2009 |
| WO | WO 2009/154842 A2 | 12/2009 |
| WO | WO 2009/158108 A2 | 12/2009 |

OTHER PUBLICATIONS

International Search Report and Written Opinion issued in PCT/US2010/032309, mailed Dec. 1, 2010 (Non-M&G 326732-02).

"Perforce software Delivers Improved Performance to its Fast Software Configuration Management System," Perforce Software, Jul. 9, 2007, 2 pages.

"Technical Overview," Apache CouchDB, The Apache Software Foundation, © 2008, 7 pages.

Feise, Joachim; "A Survey of Distributed Hypermedia Systems," ISR Institute for Software Research, University of California, Irvine, Apr. 2005, 39 pages.

Mendoza et al., "A Flexible Distribution Service for a Co-authoring Environment on the Web," IEEE Computer Society, Proceedings of Sixth Mexican International Conference on Computer Science (ENC '05) © 2005, 8 pages.

U.S. Appl. No. 11/951,973, filed Dec. 6, 2007.

U.S. Appl. No. 12/145,536, filed Jun. 25, 2008.

"Codeville," http://codeville.org/, Date Retrieved Oct. 9, 2007, 2 pgs.

"File Locks-GNU Emacs Lisp Reference Manual"; www.gnu.org/software/emacs/elisp/html_node/File-Locks.html; Mar. 28, 2006; 2 pages.

"Google, Google Docs & Spreadsheets Tour" downloaded from http://www.google.com/google-d-s/intl/en/tour2.html on Nov. 9, 2007, 1 page.

"Status of Software Reuse 577," http://www.plex86.org/Computer_Folklore/Status-of-Software-Reuse-577.html, Date Retrieved Oct. 9, 2007, 2 pgs.

Adkins et al., "GSS Collaboration in Document Development: Using Group Writer to Improve the Process", Proceedings of the 32nd Hawaii International Conference on System Sciences, 1999, 11 pages.

Adler et al., "Evaluating and Implementing a Collaborative Office Document System," 2005, http://www.sce.carleton.ca/faculty/adler/publications/2005/adler-nash-noel-2005-Collab-Office.pdf, pp. 1-18.

Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.

International Preliminary Report and Written Opinion for PCT/US/2008/083069/MS 321999.02 mailed Jun. 24, 2010, 6 pages.

International Search Report and Written Opinion for PCT/US2008/081456/MS 321449.02 mailed Mar. 31, 2009, 12 pages.

International Search Report and Written Opinion for PCT/US2008/083862/MS 321998.02 mailed Mar. 31, 2009, 11 pages.

International Search Report and Written Opinion for PCT/US2009/037920 mailed Nov. 30, 2009, 11 pages.

International Search Report and Written Opinion for PCT/US2009/039316/MS 323384.02 mailed Jan. 18, 2010, 11 pages.

International Search Report and Written Opinion for PCT/US2009/045558 mailed Nov. 30, 2009, 11 pages.

Koch, Michael, "Design Issues and Model for a Distributed Multi-User Editor" (pp. 1-21), from *Computer Supported Cooperative Work, An International Journal*, 3(3-4), 19995, pp. 359-378.

La Fontaine, Robin, Monsell EDM Ltd., Merging XMLFiles: a new approach providing intelligent merge of XML data sets, Presented at XML Europe 2002, http://www.deltaxml.com/dxml/93/version/default/part/AttachmentData/data/merging-xml-files.pdf, 21 pgs.

Lu et al., "Merging Retrieval Results in Hierarchical Peer-to-Peer Networks" SIGIR '04, Jul. 25-29, 2004, 2 pages.

McKechan et al., "Design Considerations for Creditor: A Collaborative Report Writing Editor," accessed May 16, 2008, http://userpages.umbc.edu/~jcampbel/Group01/McKechan_paper_iwces3.pdf, 10 pgs.

Microsoft Corporation, Compare and Merge Mechanisms, © 2007, http://msdn2.microsoft.com/en-us/library/ek8hk7e2(VS.80,d=printer).aspx, 1 page.

Miller et al.; "Interactive Simultaneous Editing of Multiple Text Regions"; www.co-ode.org/resources/papers/k-cap2007-seidenberg.pdf; Jun. 2001; 15 pages.

Ohst et al., "Difference Tools for Analysis and Design Documents" copyright 2003, 10 pages.

Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.

PCT International Search Report for PCT/US2009/062364 dated May 31, 2010, 11 pgs.

Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, http://cims.clayton.edu/jpreston/PhD/Research/Preston%20-%20CSCW%20Demo%20Extended%20Abstract.pdf, pp. 1-2.

Russian Notice of Allowance in Application 2010123793, mailed Apr. 13, 2012, 7 pgs.

Samiei et al., "EzMail: Using Information Vizualization Techniques to Help Manage Email", Proceedings of the 8th National Conference on Information Vizualization, 2004, 6 pages.

Appleton, Brad, "ClearView: Associating Attributes and Notes With A View", ClearCase International User's Group Conference, Sep. 1996, 16 pgs.

Bellagio, David et al., "Software Configuration Management Strategies and IBM Rational ClearCase A Practical Introduction, Second Edition" In: "Software Configuration Management Strategies and IBM Rational ClearCase A Practical Introduction, Second Edition", May 23, 2005, IBM Press, XP55009093, ISBN: 978-0-32-120019-8 pp. 173-178.

Byfield, Bruce, "Ooo Off the Wall: That's Your Version_Document Control in Ooo Writer", published on Linux Journal, Mar. 7, 2006, 6 pgs.

Chinese 1st Office Action in Application 200880121295.0, mailed Jan. 18, 2012, 6 pgs.

Chinese 1st Office Action in Application 200980115758.7, mailed Mar. 28, 2012, 10 pgs.

Chinese 2nd Office Action in Application 200880115943.1, mailed Jun. 1, 2012, 7 pgs.

Chinese Office Action in Application 200880115943.1, mailed Oct. 25, 2011, 13 pgs.

Chinese Office Action in Application 200880119647.9, mailed Nov. 24, 2011, 7 pgs.

Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, http://www.crpit.com/confpapers/CRPITV62Citro.pdf, pp. 1-10.

Dekeyser, Stijin, et al., "Path Locks for XML Document Collaboration", University of Antwerp, Dec. 12, 2002, pp. 105-114.

Ellis et al., "Groupware—Some Issues and Experiences", vol. 34, No. 1, Jan. 1, 1991, pp. 38-58.

European Extended Search Report in EP Application 09739350.8, mailed Nov. 9, 2011, 10 pgs.

European Extended Search Report in EP Application 09767155.6, mailed Mar. 26, 2012, 10 pgs.

Galli, R., "Journal File Systems in Linux," http://bulma.net/impresion.phtml?nIdNoticia=1154, Jan. 24, 2002, 15 pgs.

Google, "Share and Collaborate in Real Time," 2008, http://www.google.com/google-d-s/intl/en/tour2.html, 1 pg.

Green, Bob, "Converting Qedit to the Client/Server Model", http://www.robelle.com/library/papers/client-server/, Copyright 2004, 14 pages.

Haake et al., "Collaborative Authoring of Hypermedia Documents," 1993, http://www/pi6.fernuni-hagen.de/publ/MT-93.pdf, pp. 41-58.

Hebsgarrd, Poul J; Process Driven Document Management™, Version 6.1, Feb. 2007, http://www.brain-technology.com/upload/file_vk306c6tr779p9gntgho_16467.pdf, pp. 1-13.

Heckel, Paul; "A Technique for Isolating Differences between Files" copyright 1978, 5 pages.

Ignat et al., "Extending Real-Time Collaborative Editing Systems with Asynchronous Communication," Institute for Information Systems, ETH Zurich, (at least as early as Oct. 4, 2007), http://www.inf.ethz.ch/personal/ignat/Publications/cscwd_04.pdf, pp. 1-6.

Seidenberg et al; "A Methodology for Asynchronous MultiUser Editing of Semantic Web Ontologies"; www.xmpp.org/extensions/xep-0058.html; Mar. 28, 2006; 8 pages.

Shchepin, "XEP-0058: Multi-User Text Editing", http://groups.csail.mit.edu/uid/projects/simuledit/usenix01.pdf, Oct. 9, 2007, 5 pages.

Shepler et al., "Network File 1-15 Systems (NFS)," Version 4, Apr. 1, 2003, retrieved from http://rsync.tools.ietf.org/html/rfc3530 on Mar. 7, 2012, 275 pgs.

Shiro Sakata, "Development and Evaluation on an in-house multimedia desktop conference system", Apr. 1990, IEEE Journal on selected areas in communications, vol. 8.

Synchronous Collaborative Text Document Editing Online: MoonEdit, reviewed Sep. 13, 2007, http://www.masternewmedia.org/news/2005/02/20/synchronous_collaborative_text_document-editing.htm, pp. 1-4.

Taiwan Search Report and Office Action in Application 97142418, mailed Feb. 21, 2012, 13 pgs.

Tanebaum, Andrew S., "Moderne Betriebssysteme", 2003 Pearson, pp. 786-787.

Tichy, Walter F., RCS—A System for Version Control, Jan. 3, 1991, http://www.svlug.org/teams/rcs.pdf, 20 pgs.

US Final Office Action for U.S. Appl. No. 11/938,082, mailed Jun. 29, 2010, 30 pgs.

US Final Office Action for U.S. Appl. No. 11/957,010, mailed Aug. 18, 2010, 26 pgs.

US Final Office Action for U.S. Appl. No. 12/044,744, mailed Nov. 22, 2010, 14 pgs.

US Final Office Action for U.S. Appl. No. 12/145,536, mailed Apr. 26, 2011, 32 pgs.

US Non-Final Office Action for U.S. Appl. No. 11/938,082, mailed Dec. 28, 2009, 20 pgs.

US Non-Final Office Action for U.S. Appl. No. 11/951,973, mailed Jan. 19, 2011, 11 pages.

US Non-Final Office Action for U.S. Appl. No. 11/957,010, mailed Mar. 18, 2010, 24 pgs.
US Non-Final Office Action for U.S. Appl. No. 12/044,744, mailed Jul. 26, 2010, 15 pgs.
US Non-Final Office Action for U.S. Appl. No. 12/044,744, mailed Mar. 25, 2011, 16 pgs.
US Non-Final Office Action for U.S. Appl. No. 12/111,174, mailed Jun. 8, 2011, 18 pgs.
US Non-Final Office Action for U.S. Appl. No. 12/117,025, mailed Sep. 21, 2010, 13 pgs.
US Non-Final Office Action for U.S. Appl. No. 12/145,536, mailed Nov. 8, 2010, 28 pgs.
US Notice of Allowance for U.S. Appl. No. 11/938,082, mailed Jan. 4, 2011, 18 pgs.
US Notice of Allowance for U.S. Appl. No. 12/117,025, mailed Dec. 28, 2011, 11 pgs.
US Notice of Allowance for U.S. Appl. No. 12/117,025, mailed Apr. 14, 2011, 10 pgs.
U.S. Appl. No. 11/951,973, Notice of Allowance mailed Jun. 21, 2011, 9 pgs.
U.S. Appl. No. 11/957,010, Amendment and Response filed Apr. 9, 2012, 12 pgs.
U.S. Appl. No. 11/957,010, Office Action mailed Jan. 27, 2012, 25 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.
U.S. Appl. No. 12/044,744, Notice of Allowance mailed May 7, 2012, 12 pgs.
U.S. Appl. No. 12/044,744, Office Action mailed Dec. 30, 2011, 17 pgs.
U.S. Appl. No. 12/111,174, Amendment and Response filed Feb. 21, 2012, 9 pgs.
U.S. Appl. No. 12/111,174, Amendment and Response mailed Sep. 8, 2011, 11 pgs.
U.S. Appl. No. 12/111,174, Notice of Allowance mailed Apr. 12, 2012, 11 pgs.
U.S. Appl. No. 12/111,174, Office Action mailed Nov. 21, 2011, 20 pgs.
U.S. Appl. No. 12/117,025, Notice of Allowance mailed Sep. 15, 2011, 9 pgs.
U.S. Appl. No. 12/117,040, Amendment and Response filed Jan. 4, 2012, 12 pgs.
U.S. Appl. No. 12/117,040, Notice of Allowance mailed Mar. 29, 2012, 11 pgs.
U.S. Appl. No. 12/117,040, Office Action mailed Oct. 4, 2011, 15 pgs.
U.S. Appl. No. 12/145,536, Office Action mailed Mar. 12, 2012, 52 pgs.
U.S. Appl. No. 12/276,874, Amendment and Response filed Jan. 26, 2012, 13 pgs.
U.S. Appl. No. 12/276,874, Amendment and Response filed Jun. 22, 2011, 17 pgs.
U.S. Appl. No. 12/276,874, Final Office Action mailed Aug. 3, 2011, 15 pgs.
U.S. Appl. No. 12/276,874, Office Action mailed Oct. 26, 2011, 18 pgs.
U.S. Appl. No. 12/276,874, Office Action mailed Feb. 22, 2011, 15 pgs.
U.S. Appl. No. 12/276,874, Office Action mailed Apr. 26, 2012, 20 pgs.
U.S. Appl. No. 13/079,605, Amendment and Response filed Feb. 28, 2012, 12 pgs.
U.S. Appl. No. 13/079,605, Notice of Allowance mailed Apr. 20, 2012, 9 pgs.
U.S. Appl. No. 13/079,605, Office Action mailed Dec. 5, 2011, 31 pgs.
U.S. Appl. No. 11/938,082, Amendment and Response filed Aug. 4, 2010, 14 pgs.
U.S. Appl. No. 11/938,082, Amendment and Response filed Mar. 25, 2010, 15 pgs.
U.S. Appl. No. 11/951,973, Amendment and Response filed Apr. 13, 2011, 11 pgs.
U.S. Appl. No. 11/957,010, Amendment and Response filed Nov. 16, 2011, 12 pgs.
U.S. Appl. No. 11/957,010, Amendment and Response filed Nov. 17, 2010, 11 pgs.
U.S. Appl. No. 11/957,010, Amendment and Response filed Jun. 2, 2010, 12 pgs.
U.S. Appl. No. 12/044,744, Amendment and Response filed Oct. 26, 2010, 11 pgs.
U.S. Appl. No. 12/044,744, Amendment and Response filed Nov. 30, 2011, 12 pgs.
U.S. Appl. No. 12/044,744, Amendment and Response filed Feb. 22, 2011, 11 pgs.
U.S. Appl. No. 12/044,744, Amendment and Response filed Mar. 30, 2012, 11 pgs.
U.S. Appl. No. 12/044,744, Amendment and Response filed Jun. 24, 2011, 11 pgs.
U.S. Appl. No. 12/117,025, Amendment and Response filed Dec. 21, 2010, 17 pgs.
U.S. Appl. No. 12/117,025, Notice of Allowance mailed Jul. 21, 2011, 10 pgs.
U.S. Appl. No. 12/145,536, Amendment and Response filed Nov. 30, 2011, 20 pgs.
U.S. Appl. No. 12/145,536, Amendment and Response filed Feb. 8, 2011, 18 pgs.
U.S. Appl. No. 12/145,536, Amendment and Response filed Jul. 26, 2011, 19 pgs.
U.S. Appl. No. 12/145,536, Office Action mailed Aug. 1, 2011, 37 pgs.
U.S. Appl. No. 11/938,082, filed Nov. 9, 2007, Confirmation No. 3133.
U.S. Appl. No. 11/957,010, filed Dec. 14, 2007, Confirmation No. 8535.
U.S. Appl. No. 12/044,744, filed Mar. 7, 2008, Confirmation No. 7862.
U.S. Appl. No. 12/111,174, filed Apr. 28, 2008, Confirmation No. 6839.
U.S. Appl. No. 12/117,025, filed May 8, 2008, Confirmation No. 8234.
U.S. Appl. No. 12/117,040, filed May 8, 2008, Confirmation No. 8262.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Wilde, Erik, "Multi-User Multimedia Editing with the MultimETH System," Swiss Federal Institute of Technology, CH 8092, Zurich, (at least as early as Oct. 10, 2007), http://dret.net/netdret/docs/wilde-tikrep18.pdf, pp. 1-9.
Williams, Tim, "Version Control on the Cheap: A User-Friendly, Cost-Effective Revision Control System for SAS", 10 pgs., no date.
Zend Corporation, the PHP Company, "Team Development With Zend Studio for Eclipse", White Paper, Jan. 2008, 17 pgs.
U.S. Appl. No. 12/044,744, Notice of Allowance mailed Jun. 21, 2012, 8 pgs.
U.S. Appl. No. 13/079,605, Notice of Allowance mailed Jun. 28, 2012, 9 pgs.
U.S. Appl. No. 12/117,040, Notice of Allowance mailed Jun. 21, 2012, 9 pgs.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2 . . . , 2012 Microsoft Corporation, 5 pgs.
Grover, Chris, "Word 2007: The Missing Manual", Pogue Press, Copyright 2007, pp. 380-388.
"How to Track and Manage Changes in a Word 2002 and a Word 2003 Document," Microsoft Corporation, Mar. 8, 2007, 4 pages.
"Track Changes in Word 2007 Tutorial," Florida Gulf Coast University, copyright 2007, 2 pages.

Jalbert, Peter, "Real Time Collaboration with Google Docs and Spreadsheets," Jan. 23, 2008, 5 pages.
Tyson, Herb, "Microsoft Project 2000 Bible," Wiley Publishing, Inc., copyright 2007, 4 pages.
Willden, Andrew, "Track Changes in Word 2007," Fall 2007, 2 pages.
Chinese 1st Office Action in Application 201080019470.2, mailed Aug. 31, 2012, 8 pgs.
Australian Notice of Acceptance in Application 2008324973, mailed Aug. 22, 2012. 3 pgs.
Chinese 3rd Office Action in Application 200880115943.1, mailed Aug. 30, 2012, 6 pgs.
Taiwanese Notice of Allowance in Application 97142418, mailed Aug. 16, 2012, 4 pgs.
Australian Office Action in Application 2008335565, mailed 8/30/201, 3 pgs.
Chinese 2nd Office Action in Application 200880119647.9, mailed Aug. 13, 2012, 6 pgs.
Chinese 2nd Office Action in Application 200880121295.0, mailed Oct. 23, 2012, 10pgs.

Chinese 1st Office Action in Application 200980116872.1, mailed Oct. 9, 2012, 14 pgs.
Australian Notice of Allowance in Application 2008335565, mailed Sep. 18, 2012, 3 pgs.
Notice of Allowance mailed Aug. 20, 2012, in co-pending U.S. Appl. No. 12/117,040, 14 pgs.
Notice of Allowance mailed Aug. 29, 2012, in co-pending U.S. Appl. No. 12/111,174, 27 pgs.
Office Actiion mailed Sep. 27, 2012, in co-pending U.S. Appl. No. 12/276,874, 22 pgs.
Notice of Allowance mailed Oct. 22, 2012, in co-pending U.S. Appl. No. 13/079,605, 9 pgs.
Office Action mailed Oct. 11, 2012, in co-pending U.S. Appl. No. 13/539,473, 23 pgs.
Office Action mailed Oct. 31, 2012, in co-pending U.S. Appl. No. 12/117,025, 11 pgs.

* cited by examiner

FAST MERGE SUPPORT FOR LEGACY DOCUMENTS

BACKGROUND

Network-based document collaboration systems permit multiple users to simultaneously access and coauthor a document. Although multiple users are permitted to coauthor a document, in order to prevent conflicts, the system may restrict the areas in a document in which each user can make edits to minimize chances for conflicting changes when the copies of the documents are merged.

Legacy systems typically may not allow for the coauthoring of documents created on the legacy systems. Documents created on these systems may therefore not be configured properly to support coauthoring on document collaboration systems. This can result in undesired conflicting edits.

SUMMARY

Embodiments of the disclosure are directed to a method for merging document metadata at a client computer. A document is obtained from a server computer by a user at the client computer, and the document is opened at the client computer. In response to opening the document at the client computer, a determination is made as to whether the document includes unit identifiers. When it is determined that the document does not include unit identifiers, a unit identifier is assigned to each unit in the document.

A first message is received from the server computer providing notification that at least one other user is authoring the document. In response to receiving the first message from the server computer providing notification that at least one other user is authoring the document, a second message is sent to the server computer, the second message including first metadata for the document. In response to sending the second message to the server computer, a third message is received from the server computer, the third message including second metadata for the document. In response to receiving the third message from the server computer, a determination is made whether the first metadata and the second metadata should be merged. When it is determined that the first metadata and the second metadata should be merged, unit identifiers are adjusted in the document based on the second metadata.

The details of one or more techniques are set forth in the accompanying drawings and the description below. Other features, objects, and advantages of these techniques will be apparent from the description, drawings, and claims.

DETAILED DESCRIPTION

The present application is directed to systems and methods for creating unit identifiers for legacy documents created on legacy network-based shared document systems that do not provide unit identifiers.

In example embodiments, a document is broken into units. Units can be any subpart of a document, for example sentences, paragraphs, headings, drawings, tables, etc. A document may contain only one unit, for example a single table, sentence, or multiple units, such as multiple tables, sentences, or paragraphs. For the example embodiments disclosed herein, a document unit is a paragraph of the document.

Legacy documents are those documents that were created by legacy systems that do not provide for coauthoring. The legacy documents therefore do not include paragraph identifiers. Paragraph identifiers are created for a legacy document when the document is saved on a document collaboration system or when two or more authors edit the document on the document collaboration system.

Because paragraph identifiers are created for a legacy document in this manner, when two or more authors using the document collaboration system access the same legacy document, paragraphs currently being edited by one of the authors are identified and paragraph locks are propagated to the other authors. The paragraph locks prevent the authors that are not currently editing a locked paragraph from editing the locked paragraph until the lock is removed. In this disclosure, an author is defined as a user who is creating or editing a document.

The systems and methods also provide for comparing and merging paragraph identifiers in documents and for providing paragraph identifier merging and paragraph lock propagation. A unique set of paragraph identifiers is created each time an author accesses a legacy document that does not include paragraph identifiers. When a second author accesses the same legacy document, the paragraph identifiers are compared and merged so that each author has a synchronized set of paragraph identifiers for the legacy document.

Figure 1:
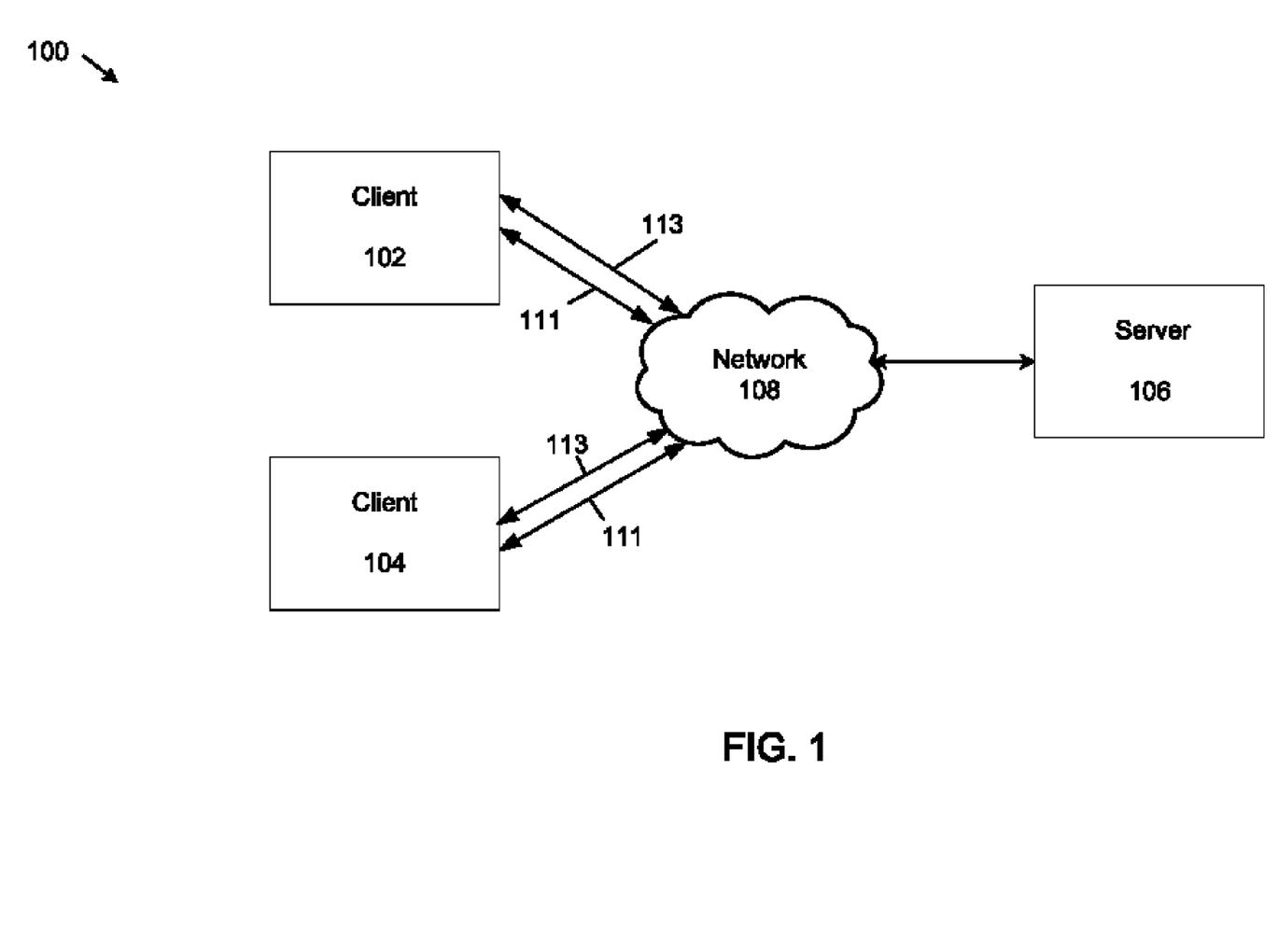
FIG. 1 shows an example system for fast merge support of legacy documents.

FIG. 1 shows an example system 100 that supports fast merging of legacy documents. The system 100 includes clients 102, 104, a server 106 and a network 108. More or fewer clients and servers can be used. In this disclosure the terms client and client computer are used interchangeably and the terms server and server computer are used interchangeably.

Among the plurality of information stored on the clients 102, 104 is a client operating system ("OS") and client applications. The client OS is a program that manages the hardware and software resources of the client system. The client applications utilize the resources of the clients 102, 104 to directly perform tasks specified by a user, for example a user who is authoring a document. For example, the clients 102, 104 include one or more software applications, such as word processing programs, that are used to create and edit document files. One example of such an application is Microsoft Word from Microsoft Corporation of Redmond, Wash. Other examples of such applications are also applicable.

Server 106 is a file server that is accessible through a network. Server 106 stores a plurality of files. These files can include both software applications and documents, as described further herein. Server 106 controls access to the documents stored by the server 106.

In example embodiments, the server 106 can be located within an organization or can be part of a document collaboration system. An example document collaboration system is a SHAREPOINT® team services portal server services provided by Microsoft Corporation. An example shared document server is Microsoft Office SharePoint Server 2007 provided by Microsoft Corporation. Other configurations can be used.

In example embodiments, paragraph identifiers are merged and paragraph locks are propagated through a metadata channel 111 that is separate from a data channel 113 used to save the edited contents of the document. By transmitting metadata separately from document content, authors are able to receive paragraph locks fast, independent of a content save operation. Because the paragraph locks prevent two or more authors from editing the same content simultaneously, the integrity of the coauthoring process is enhanced.

Figure 2:
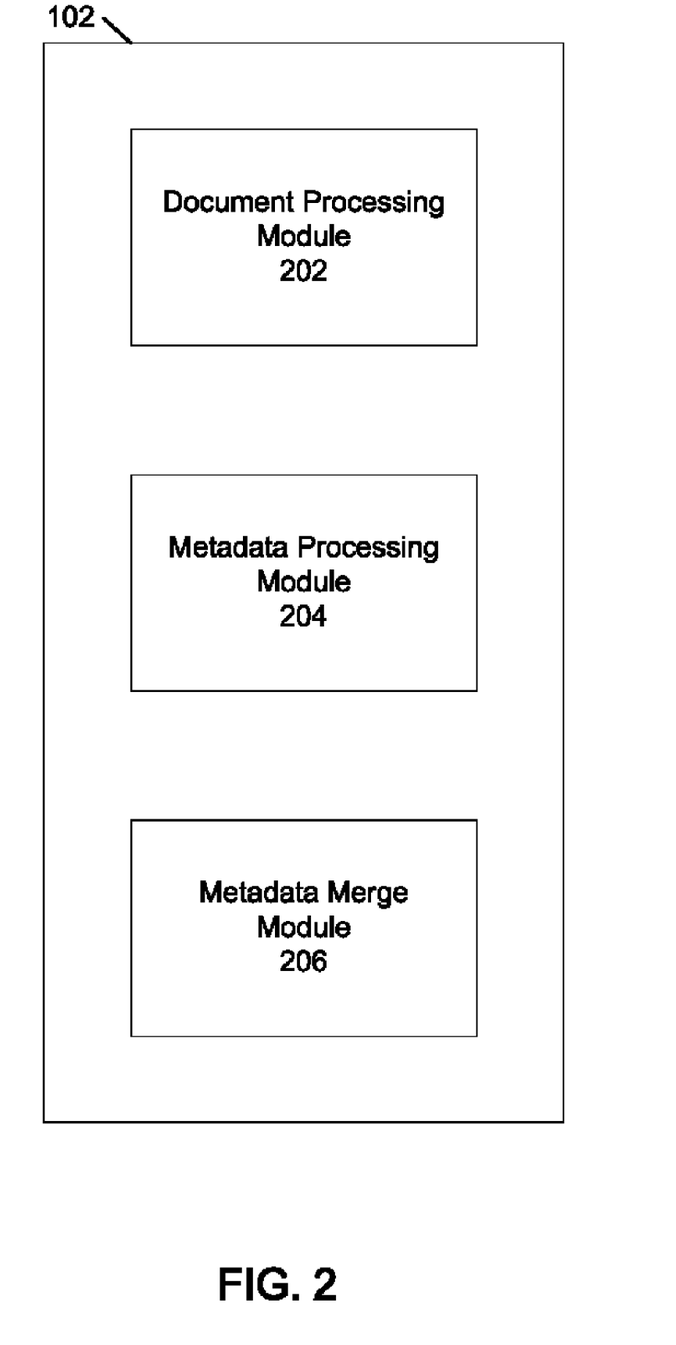
FIG. 2 shows example modules of an example client computer of FIG. 1 that implements a capability for fast merge support of legacy documents.

FIG. 2 shows a detailed view of the logical modules of client computer 102. Client computer 102 includes example document processing module 202, example metadata processing module 204 and example metadata merge module 206. The example document processing module 202 supports the creation, editing and saving of document content, such as text, headers, tables, illustrations, etc. The example document processing module 202 also supports the processing of information about document content, known as metadata. The example document processing module 202 implements a word processing application, for example the Microsoft Word word processing application from Microsoft Corporation.

The example metadata processing module 204 processes the metadata in the document. Some examples of metadata are the document name, date of creation or last edit, document identifier, revision identifier, paragraph identifiers, paragraph range, and paragraph locks. Other kinds of document metadata are possible.

A paragraph identifier is a number that identifies each paragraph in a document. In example embodiments, paragraph identifiers may include identifiers for sub-units of a document such as headers and footers in addition to actual paragraphs.

A paragraph lock is metadata that indicates that an author is editing a paragraph of a document. In order to avoid conflicts, only one author is permitted to edit the same content at the same time. When one author edits a paragraph of a document, a paragraph lock is received for that paragraph for all other authors that have the document open. The document lock prevents these other authors from editing the paragraph until the lock is removed.

Additional details regarding such locks can be found in U.S. patent application Ser. No. 12/145,536 filed on Jun. 25, 2008, the entirety of which is hereby incorporated by reference.

When an author on client computer 102 opens a legacy document that does not include paragraph identifiers, the example metadata processing module 204 generates a document identifier for the document. The document identifier is typically a number that is randomly generated from a specific number range. For example, the document identifier may be a 32-bit number that is in the range from 1 to 0x7fffffff.

The example metadata processing module 204 assigns the document identifier to the first paragraph in the document. The remaining paragraphs are then sequentially numbered from the document identifier. For example, if there are five paragraphs in the document and the randomly generated document identifier is 1000, the five paragraphs are assigned paragraph identifiers 1000, 1001, 1002, 1003 and 1004, respectively.

The example metadata processing module 204 also identifies as metadata the next paragraph number in the paragraph identifier sequence. In this example, the next paragraph identifier is 1005. Although the paragraph identifiers are sequentially generated when a document is initially opened, paragraph identifiers for any paragraphs that may be added as a result of editing the document are randomly generated.

When the author on client 102 opens the document, the example metadata processing module 204 also obtains a revision identifier for the document. Each document stored in the example document collaboration system includes a revision identifier that identifies a version number for the document. In some example embodiments, the revision identifier may be part of a file system identifier for the document. The example metadata processing module 204 keeps track of the revision identifier as metadata.

Because at this time, the author on client 102 is the only author that has opened the document, the document does not contain any paragraph locks. The author on client 102 is free to edit the document at will, editing existing paragraphs, deleting paragraphs, adding new paragraphs, making formatting changes, etc. Until the author on client 102 saves these changes, the server 106 does not know about the changes.

When an author on client 104 opens a copy of the same document, server 106 presents the author on client 104 with a version of the document that does not include the changes the author on client 102 made to the document if the author on client 102 has not saved the document before client 104 opens the document.

When the document is opened on client 104, the example metadata processing module 204 on client 104 randomly generates a document identifier for the version of the document opened at client 104. The example metadata processing module 204 on example client 104 assigns the document identifier to the first paragraph of the document opened on client 104 and sequentially assigns paragraph numbers to the remaining paragraphs of the document opened on client 104.

Because the document identifiers are randomly generated, the document and paragraph identifiers for the copies of the document opened at clients 102 and 104 are different. In order to propagate paragraph locks to the two opened documents, the paragraph identifiers for each opened document must be merged and synchronized. This is because paragraph locks are associated with specific paragraphs. Therefore, paragraphs having common content on multiple copies of opened documents are required to have to have identical paragraph identifiers.

The example metadata merge module 206 compares and synchronizes paragraph identifiers between documents. When the author on client 104 opens the document, server 106 informs the author on client 104 that there is at least one other user already authoring the document. Server 106 also informs the author on client 102 that another author has opened the document. When the author at client 102 discovers that another author has opened the document, the example metadata merge module 206 on client 102 sends metadata to server 106. Similarly, when the author at client 104 discovers that another author has opened the document, the example metadata merge module 206 at client 104 sends metadata to server 106 using the metadata channel 111.

The example metadata sent to server 106 by clients 102 and 104 includes three metadata components—the document identifier, the next paragraph identifier and the revision identifier. In example embodiments, these three components are called a metadata seed. When server 106 receives the metadata seed from clients 102 and 104, server 106 determines which metadata seed arrived first. The metadata seed that arrived at server 106 first is considered the winner. The winning metadata seed information is then propagated to the other authors. For example, if server 106 receives the metadata seed from client 104 first, the metadata seed information on client 102 is merged with the metadata seed information from client 104.

Figure 3:
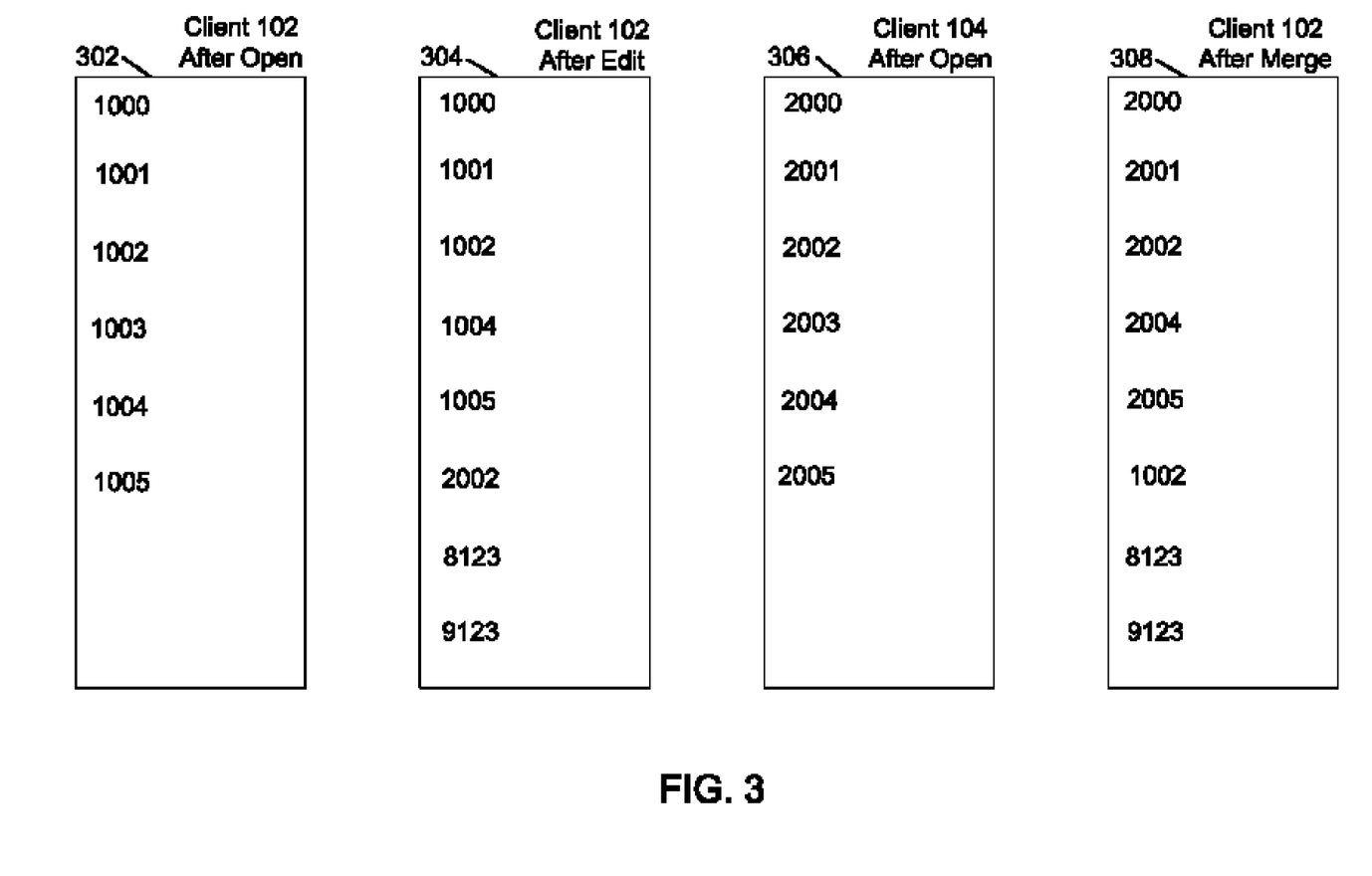
FIG. 3 an example of document identifier renumbering during a metadata merge operation.

FIG. 3 shows an example of how the example metadata merge module 206 merges metadata using metadata from two authors. When an author on client 102 initially opens a document that doesn't include paragraph identifiers (e.g., a document created on a legacy system that does not support coauthoring), metadata operations merge module 204 assigns paragraph identifiers to each paragraph of the document. An example set of paragraph identifiers is shown for example document copy 302. In this example, there are six paragraphs in the document with paragraph identifiers 1000, 1001, 1002, 1003, 1004 and 1005, respectively.

During the editing of the document, the author on client 102 deletes paragraph 1003 and adds paragraphs with paragraph identifiers 2002, 8123 and 9123. This is shown in example document copy 304. The author on client 102 is able to modify, add, and/or delete any paragraph in the document because currently there are no other users authoring the document so there are no paragraph locks on the document. The added paragraphs have paragraph identifiers that are randomly generated, as described above.

After the author on client 102 makes the changes to the document shown in example document copy 304, the author on client 104 opens a copy of the document. A copy of the document is obtained from server 106. Because the changes to the document made by the author on client 102 have not yet been saved to server 106, the document opened by the author on client 104 contains the same content as shown in example document copy 302.

When the document is opened on client 104, the metadata operations module 204 on client 104 randomly generates a document identifier for the document opened at client 104. In this example, the document identifier is 2000. The example metadata operations module 204 on client 104 assigns the document identifier 2000 to the first paragraph of the document opened on client 104. The example metadata operation module 204 on client 104 then sequentially numbers the remaining paragraphs in the document. The resulting paragraph numbering is shown in example document copy 306.

At some given interval, clients 102, 104 both synchronize the metadata associated with the document. This synchronization happens over the metadata channel 111, as described above. In example embodiments, the synchronization interval can be set to happen at a specific period, such as every 2 second, 5 second, 10 seconds, 20, seconds, 30 seconds, 1 minute, 5 minutes, 10 minutes, or 30 minutes. Other intervals can be used.

In the example, the metadata seed from client 104 is received at server 106 first. When server 106 determines that the metadata seed from client 104 was received first and is the winning seed, server 106 sends the metadata seed received from client 104 to client 102. When client 102 receives the metadata seed from server 106, the example metadata merge module 206 on client 102 merges the metadata seed received from server 106 with the paragraph metadata on client 102. The result of the merge is shown in example document copy 308.

Example document copy 308 shows that as a result of the merge, paragraphs identifiers 1000, 1001, 1002, 1004 and 1005 (from example document copy 304) are changed to 2000, 2001, 2002, 2004 and 2005, respectively. Because the document identifier of the winning seed is 2000, the example metadata merge module 206 on client 102 renumbers the paragraphs in the paragraph range determined from the metadata seed received from server 106. The renumbering makes the paragraphs in the paragraph range consistent with the document identifier 2000. The paragraph range can be determined from the metadata seed because the metadata seed includes the document identifier (which is also the first paragraph of the paragraph range) and the next paragraph identifier (which is the next sequential paragraph identifier following the last paragraph identifier in the paragraph range) and because all the paragraphs in the paragraph range are sequentially numbered. Therefore, the first paragraph in the document opened at client 102 is renumbered from 1000 to 2000. The paragraph range includes paragraphs 1000 through 1005. Therefore, paragraph 1001 is renumbered to 2001, paragraph 1002 is renumbered to 2002, paragraph 1004 is renumbered to 2004 and paragraph 1005 is renumbered to 2005. As discussed earlier, paragraph 1003 was deleted.

The metadata merge module 206 on client 102 also determines all paragraph identifiers the document opened at client 102 that are not included in the paragraph range. This includes paragraphs with paragraph identifiers 2002, 8123 and 9123 that were added to example document copy 304. Because added paragraph 2002 conflicts with renumbered paragraph 2002 (original paragraph 1002), the example metadata merge module 206 renumbers added paragraph 2002 to 1002. The example metadata merge module 206 renumbers added paragraph 2002 to 1002 because paragraph identifier 1002 is no longer used in the document and, therefore, there is no conflict if paragraph 1002 is used. The example metadata merge module 206 does not change paragraph identifiers 8123 and 9123 because there are no conflicts caused by these paragraph identifiers.

When the metadata merge is completed, paragraphs with common content for the document opened on client 102 and for the document opened on client 104 have identical paragraph identifiers. For example, if before the merge paragraphs having identifiers 1000, 1001, 1002, 1004 and 1005 for the document opened on client 102 have common content with paragraphs having identifiers 2000, 2001, 2002, 2004 and 2005, respectively for the document opened on client 104, after the merge, these paragraphs on both client 102 and client 104 have paragraph identifiers 2000, 2001, 2002, 2004 and 2005. This permits paragraph locks to be assigned to these paragraphs. For example, when an author at client 102 edits paragraph 2004, a paragraph lock is transmitted to the document at client 104, preventing client 104 from editing paragraph 2004. The paragraph lock assures that multiple authors cannot edit the same paragraph simultaneously.

When the author on client 102 performs a save operation, the content changes for the document opened on client 102 are sent to server 106 through the data channel 113. In addition to transmitting content changes, the save operation also removes any paragraph locks associated with the paragraphs previously edited on client 102. The change in locks is communicated through the metadata channel 111.

The saved content and the removal of the paragraph locks are propagated to all authors that are currently authoring the document. This permits the authors to edit paragraphs that were previously locked. However, once an author starts editing a paragraph, a new paragraph lock is created and propagated to all other authors that are currently editing the document through the metadata channel 111.

Once the paragraph identifiers are synchronized, further changes to the document by either client 102 or client 104 can be synchronized using the paragraph identified in the manner described in U.S. patent application Ser. No. 11/951,973, now U.S. Pat. No. 8,028,229, filed on Dec. 6, 2007, the entirety of which is hereby incorporated by reference.

The above discussion of metadata merging describes two authors. In other example embodiments, more than two authors may edit the same document. The same metadata merge operations apply for example embodiments having more than two authors.

Figure 4:
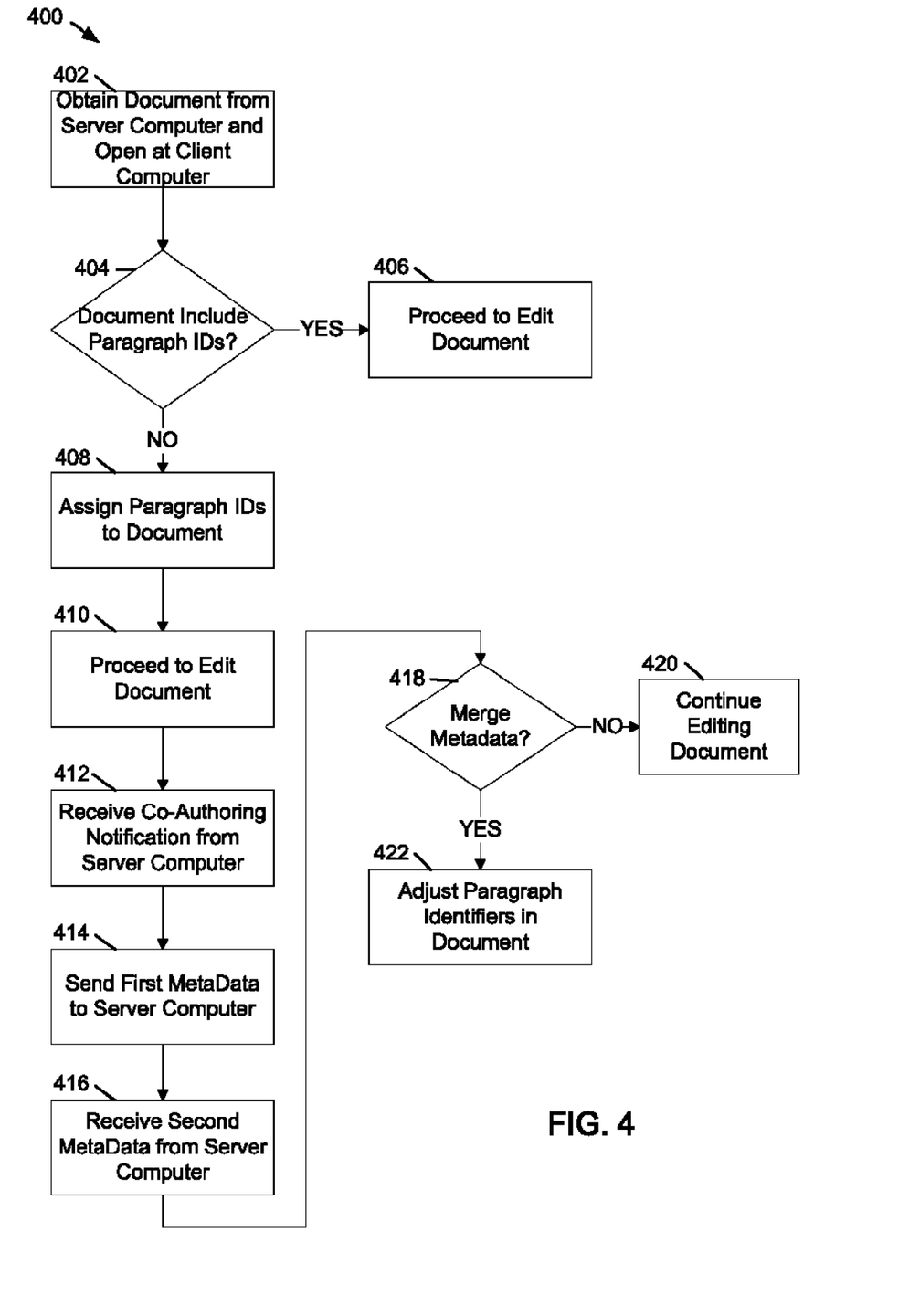
FIG. 4 shows a flowchart of a method for merging document metadata at a client computer.

FIG. 4 shows an example flowchart of a method 400 for merging document metadata at a client computer. At operation 402, an author on example client 102 obtains a document from example server 106 and opens the document on client 102. Server 106 is a server such as Microsoft SharePoint Server 2007, used with an Internet-based document collaboration system such as Microsoft SharePoint. Client 102 opens the document with a word processing program such as Microsoft Word. Example method 400 assumes that at the time the author at client 102 opens the document, no other authors have the document open.

At operation 404, client 102 determines whether the document includes paragraph identifiers. Typically, legacy documents stored on server 106 do not include paragraph identifiers because the legacy documents are created by word processing applications that do not support coauthoring or include paragraph identifiers. If the document does include paragraph identifiers, client 102 can start editing the document at operation 406.

If the document does not include paragraph identifiers, paragraph identifiers are assigned to the document at operation 408. The example metadata operations module 204 randomly generates a document identifier for the document. The document identifier, typically a 32-bit number with a range from 1-0x7fffffff, is then assigned to the first paragraph of the document. Then, the remaining paragraphs are sequentially numbered from the document identifier.

At operation 410, the author on client 102 proceeds to edit the document. Because the author on client 102 is the only author that has opened the document, the author on client 102 can edit any paragraph of the document and can also add and delete paragraphs.

At operation 412, client 102 receives a message from server 106 that provides notification to client 102 that at least one other author, for example an author on client 104, has opened the document. When client 102 receives notification that at least one other author has opened the document, at operation 414 the example metadata operations module 204 on client 102 sends first metadata to server 106. The first metadata includes a metadata seed for the document open on client 102, including the document identifier, a next paragraph identifier and a revision identifier.

At operation 416, client 102 receives a message from server 106 that includes second metadata. The second metadata originates from one of the other authors who is authoring the document, for example the author on client 104. The second metadata represents the winning metadata seed received at server 106. The winning metadata seed is the first metadata seed received at server 106 from the at least one other authors that are authoring the document. The second metadata includes the document identifier, next paragraph identifier and revision identifier from the client that sends the winning metadata seed to server 106, for example client 104.

Figure 5:
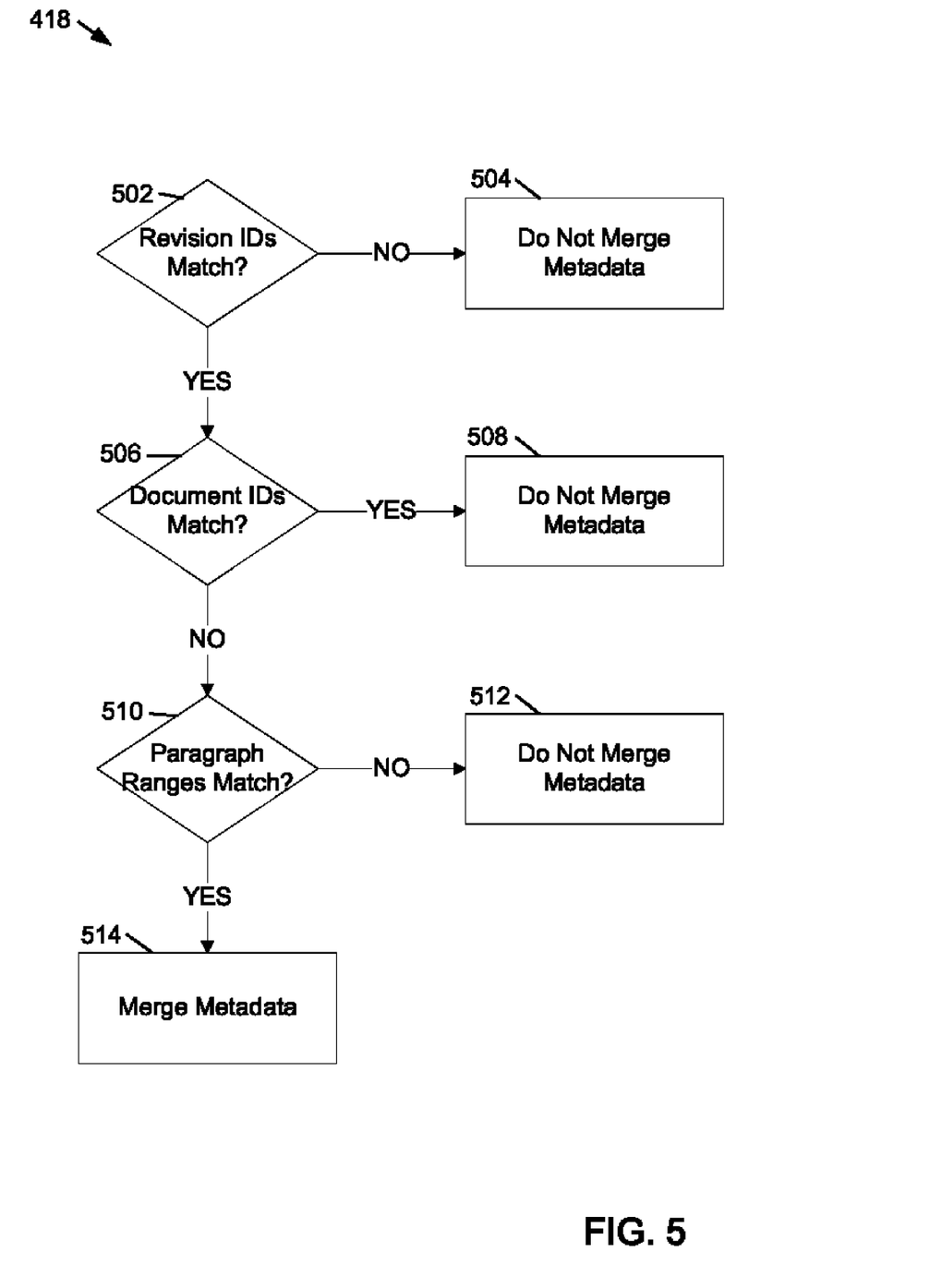
FIG. 5 shows a flowchart of a method for determining whether metadata should be merged at a client computer.

At operation 418, client 102 determines whether the first metadata and the second metadata should be merged. The steps involved in determining whether the first metadata and the second metadata should be merged are shown in FIG. 5 and discussed later in this disclosure. If it is determined that the first metadata and the second metadata should not be merged, at operation 420 the author at client 102 continues to edit the document.

If it is determined that the first metadata and the second metadata should be merged, at operation 422 the example metadata merge module 206 on client 102 merges the first metadata and the second metadata. The metadata is merged by adjusting paragraph identifiers in the document opened by the author on client 102. The operation of adjusting paragraph identifiers includes changing the paragraph identifiers for all paragraphs in the document opened on client 102 that have common content with corresponding paragraphs in the document opened on client 104. The paragraph identifiers on the document opened on client 102 are changed to corresponding paragraph identifiers indicated by the document identifier and the next paragraph identifier included in the second metadata. For example, if paragraphs 1-3 on the document opened on client 102 have common content with paragraphs 1-3 on the document opened on client 104 and if the document identifier for the document on client 102 is 1000 and the document identifier in the second metadata is 2000, the first three paragraphs in the document on client 104 are renumbered to 2000, 2001 and 2002.

In addition, if it is determined that paragraphs added to the document opened on client 102, but not saved, have paragraph identifiers in the paragraph range indicated by the second metadata, the example metadata merge module 206 changes these paragraph identifiers so that they are unique in the document.

FIG. 5 shows an example flowchart of a method 418 for determining whether metadata should be merged at a client computer. The method is implemented when an author at a client computer, for example client computer 102, edits a document that includes a first metadata seed and the client computer receives a second metadata seed from a server computer. The second metadata seed represents metadata from a second author that has opened the document. The second metadata seed represents the first metadata seed received at the server computer from one or more authors that have opened and are authoring the document. The metadata seeds include a document identifier, a next page identifier and a revision identifier.

At operation 502, a determination is made whether the revision identifier from the first metadata seed matches the revision identifier from the second metadata seed. The revision identifier indicates the version of the document. In order to merge metadata, the documents must be at the same revision level. This is because when each author initially opens the document, the content of both documents must be the same. When it is determined that the revision identifier from the first metadata seed does not match the revision identifier from the second metadata seed, at operation 504 metadata is not merged and the author at client 102 continues editing.

When it is determined that the revision identifier from the first metadata seed matches the revision identifier from the second metadata seed, at operation 506 a determination is made whether the document identifier from the first metadata seed matches the document identifier from the second metadata seed. When the document identifiers match, it indicates that documents have already been synchronized and that a metadata merge is not necessary. In this case, at operation 508 metadata is not merged and the author at client 102 continues editing.

When it is determined that the document identifier from the first metadata seed does not match the revision identifier from the second metadata seed, at operation 510, a determination is made whether the size of the paragraph range as determined from the first metadata seed matches the size of the paragraph range as determined from the second metadata seed. When it is determined that the paragraph ranges are not the same, at operation 512 metadata is not merged and the author at client 102 continues editing.

When it is determined that the paragraph range as determined that the paragraph ranges are the same, at operation 514 the first metadata seed and the second metadata seed are merged. The merging of the first metadata seed and the second metadata seed comprises adjusting paragraph identifiers in the document opened on client 102 per operation 422, as discussed.

Figure 6:
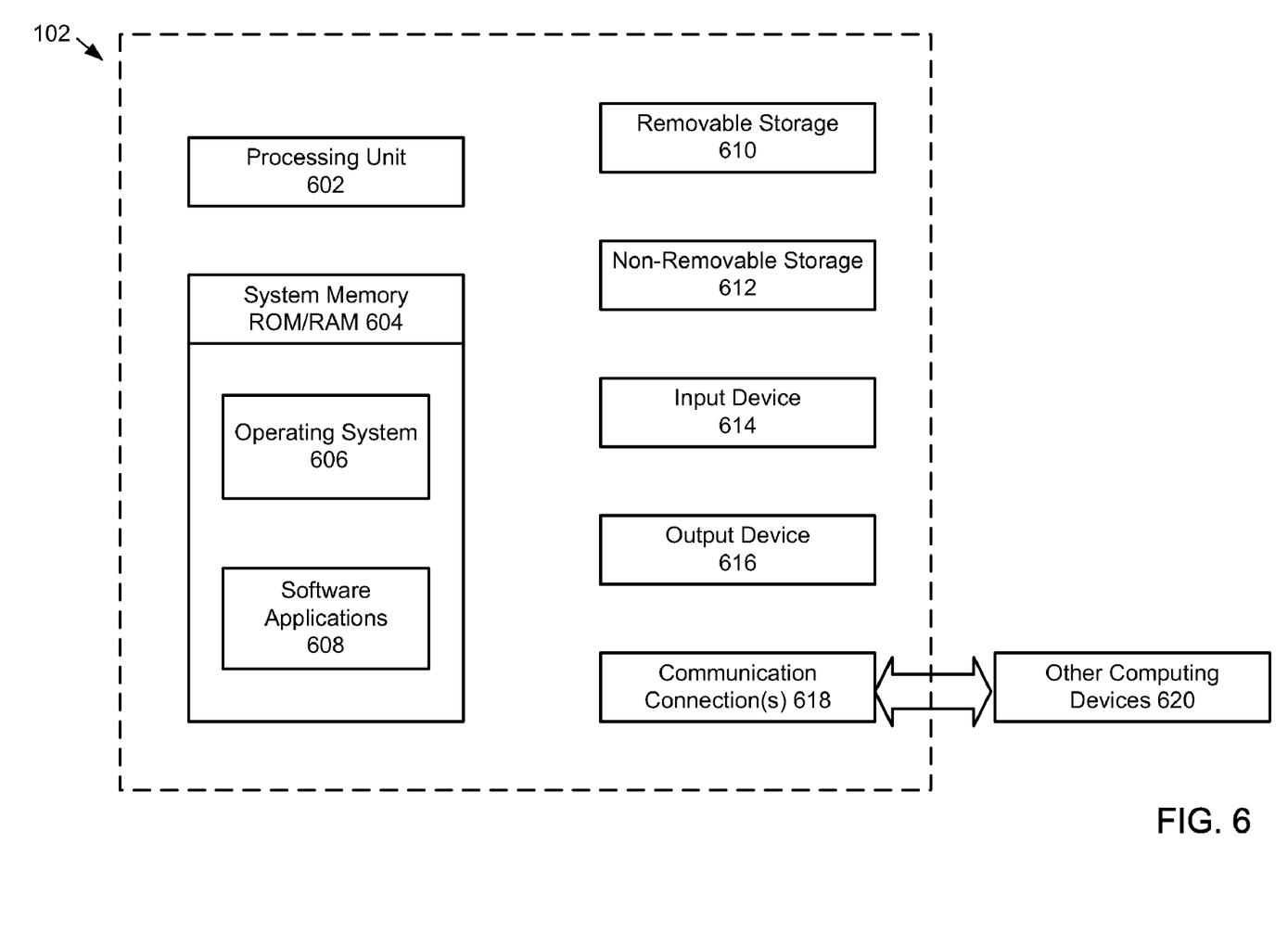
FIG. 6 shows example components of the client computer of FIG. 2.

With reference to FIG. 6, example components of client 102 are shown. In example embodiments, the client 102 is a computing device, such as a desktop computer, laptop computer, personal data assistant, or cellular device. The client 102 can include input/output devices, a central processing unit ("CPU"), a data storage device, and a network device.

In a basic configuration, the computing device 102 typically includes at least one processing unit 602 and system memory 604. Depending on the exact configuration and type of computing device, the system memory 604 may be volatile (such as RAM), non-volatile (such as ROM, flash memory, etc.) or some combination of the two. System memory 704 typically includes an operating system 606 suitable for controlling the operation of a networked personal computer, such as the WINDOWS® operating systems from MICROSOFT CORPORATION of Redmond, Wash. or a server, such as Windows SharePoint Server 2007, also from MICROSOFT CORPORATION of Redmond, Wash. The system memory 604 may also include one or more software applications 608 and may include program data.

The computing device 102 may have additional features or functionality. For example, the computing device 102 may also include additional data storage devices (removable and/or non-removable) such as, for example, magnetic disks, optical disks, or tape. Such additional storage is illustrated in FIG. 6 by removable storage 610 and non-removable storage 612. Computer storage media may include volatile and non-volatile, removable and non-removable media implemented in any method or technology for storage of information, such as computer readable instructions, data structures, program modules, or other data. System memory 604, removable storage 610 and non-removable storage 612 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 102. Any such computer storage media may be part of device 102. Computing device 102 may also have input device(s) 614 such as keyboard, mouse, pen, voice input device, touch input device, etc. Output device(s) 616 such as a display, speakers, printer, etc. may also be included. These devices are well known in the art and need not be discussed at length here.

The computing device 102 may also contain communication connections 618 that allow the device to communicate with other computing devices 620, such as over a network in a distributed computing environment, for example, an intranet or the Internet. Communication connection 618 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A method implemented on a client computer, for merging document metadata at a client computer, the method comprising:

obtaining, by the client computer, a document from a server computer at the client computer, the document being requested by a user at the client computer;

opening the document at the client computer;

in response to opening the document at the client computer, determining, by the client computer, whether the document includes unit identifiers, the unit identifiers including one or more paragraph identifiers, sentence identifiers or table identifiers;

when a determination is made that the document does not include paragraph identifiers, assigning a paragraph identifier to each paragraph in the document;

receiving a first message from the server computer providing notification that at least one other user is authoring the document;

in response to receiving the first message from the server computer that at least one other user is authoring the document, sending a second message to the server computer, the second message including first metadata for the document, the first metadata including a first next paragraph identifier for the document, a first document identifier and a first revision identifier;

determining a first paragraph identifier range from the first document identifier and from the first next paragraph identifier, a first identifier in the first paragraph identifier range being the first document identifier and a last identifier in the first paragraph identifier range being one less than the first next paragraph identifier;

in response to sending the second message to the server computer, receiving a third message from the server computer, the third message including second metadata for the document, the second metadata including a second next paragraph identifier for the document, a second document identifier and a second revision identifier;

determining a second paragraph identifier range from the second document identifier and from the second next paragraph identifier, a first identifier in the second paragraph identifier range being the second document identifier and a last identifier in the second paragraph identifier range being one less than the second next paragraph identifier;

in response to receiving the third message from the server computer, determining whether the first metadata and the second metadata should be merged by:

determining whether the first revision identifier matches the second revision identifier;

when a determination is made that the first revision identifier matches the second revision identifier, determining whether the first document identifier matches the second document identifier;

when a determination is made that the first revision identifier matches the second revision identifier and when a determination is made that the first document identifier does not match the second document identifier, determining whether a size of the first paragraph identifier range matches a size of the second paragraph identifier range; and when a determination is made that the first revision identifier matches the second revision identifier, when a determination is made that the first document identifier does not match the second document identifier and when a determination is made that the size of the first paragraph identifier range matches the size of the second paragraph identifier range, determining that the first metadata and the second metadata should be merged; and when a determination is made that the first metadata and the second metadata should be merged, adjusting paragraph identifiers in the document based on the second metadata.

2. The method of claim 1, wherein the first paragraph identifier range is determined from the first document identifier and wherein the second paragraph identifier range is determined from the second metadata, the first paragraph identifier range including a first identifier and a last identifier and the second paragraph identifier range including a first identifier and a last identifier, the first identifier in the first paragraph identifier range having an initial value equal to the first document identifier and the last identifier in the first paragraph identifier range having a value equal to one less than the first next paragraph identifier, the first identifier in the second paragraph identifier range have an initial value equal to the second document identifier and the last identifier in the second paragraph identifier range have a value equal to one less than the second next paragraph identifier.

3. The method of claim 2, wherein the first document identifier is randomly generated, wherein each paragraph in the first paragraph identifier range is sequentially numbered starting from the first document identifier, and wherein each paragraph in the second paragraph identifier range is sequentially numbered starting from the second document identifier.

4. The method of claim 3, wherein adjusting paragraph identifiers in the document based on the second metadata comprises changing the first identifier in the first paragraph identifier range to the second document identifier.

5. The method of claim 4, further comprising changing paragraph identifiers for paragraphs included in the first paragraph identifier range to corresponding paragraph identifiers included in the second paragraph identifier range.

6. The method of claim 5, further comprising determining whether one or more paragraph identifiers from paragraphs not included in the first paragraph identifier range are included in the second paragraph identifier range.

7. The method of claim 5, further comprising, when a determination is made that one or more paragraph identifiers from paragraphs not included in the first paragraph identifier range are included in the second paragraph identifier range, changing the one or more paragraph identifiers from paragraphs not included in the first paragraph identifier range to a paragraph identifier included in the first paragraph identifier range.

8. A computing device, comprising:
a processing unit;
a system memory connected to the processing unit, the system memory comprising instructions that, when executed by the processing unit, cause the processing unit to create:

a metadata processing module that generates, monitors and stores metadata for a document on the computing device, the metadata including first metadata and second metadata, the first metadata including a first document identifier, a first next paragraph identifier and a first revision identifier, the second metadata including a second document identifier, a second next paragraph identifier and a second revision identifier, the metadata processing module generating a first paragraph identifier range from the first document identifier and from the first next paragraph identifier and a second paragraph identifier range from the second document identifier and from the second next paragraph identifier, the first paragraph identifier range including a first paragraph identifier and a last paragraph identifier, the first paragraph identifier having a value equal to the first document identifier and the last paragraph identifier having a value equal to one less than the first next paragraph identifier; and a metadata merge module that merges the metadata for the document with metadata received from a server computer, wherein the metadata merge module determines that the first metadata and the second metadata should be merged and adjusts paragraph identifiers in the document based on the second metadata when a determination is made that the first revision identifier matches the second revision identifier and when a determination is made that the first document identifier does not match the second document identifier and when a determination is made that a size of the first paragraph identifier range matches a size of the second paragraph identifier range.

9. The computing device of claim 8, wherein the metadata processing module stores metadata in a file on the server computer that is separate from the document.

10. The computing device of claim 8, wherein the metadata processing module generates paragraph identifiers for each paragraph in the first paragraph identifier range, each paragraph identifier in the first paragraph identifier range being sequentially numbered.

11. The computing device of claim 8, wherein the metadata merge module changes the second document identifier to a document identifier included in the metadata received by the server computer.

12. The computing device of claim 8, wherein the metadata merge module changes a paragraph identifier of one or more paragraphs not included in the first paragraph range to a paragraph identifier included in the second paragraph range when the one or more paragraphs not included in the first paragraph range are included in a paragraph range determined from a document identifier and a next paragraph identifier included in the metadata received from the server computer.

13. A computer-readable data storage memory comprising instructions that, when executed by a processing unit of an electronic computing device, cause the processing unit to:
obtain a document from a server computer, the document being requested by a user at the electronic computer device;
open the document;
in response to opening the document, determine whether the document includes paragraph identifiers;
when it is determined that the document does not include paragraph identifiers, assign a paragraph identifier to each paragraph in the document by:
randomly generate an identifier for the first paragraph of the document;

designate the identifier for the first paragraph of the document as a first document identifier;

sequentially assign identifiers to the remaining paragraphs in the document; and designate a first next paragraph identifier having a value one greater than the identifier assigned to the last paragraph in the document;

receive a first message from the server computer that at least one other user is authoring the document;

in response to receiving the first message from the server computer that at least one other user is authoring the document, send a second message to the server computer, the second message including first metadata for the document, the first metadata including the first document identifier, the first next paragraph identifier, and a first revision identifier;

determine a first paragraph identifier range from the first document identifier and from the first next paragraph identifier, the first identifier in the first paragraph identifier range being the first document identifier and the last identifier in the first paragraph identifier range being one less than the first next paragraph identifier;

in response to sending the second message to the server computer, receive a third message from the server computer, the third message including second metadata for the document, the second metadata including a second document identifier, a second paragraph identifier range and a second revision identifier;

determine a second paragraph identifier range from the second document identifier and from the second next paragraph identifier, the first identifier in the second paragraph identifier range being the second document identifier and the last identifier in the second paragraph identifier range being one less than the second next paragraph identifier;

in response to receiving the third message from the server computer, determine whether the first metadata and the second metadata should be merged by:

determine whether the first revision identifier matches the second revision identifier;

when it is determined that the first revision identifier matches the second revision identifier, determine whether the first document identifier matches the second document identifier;

when it is determined that the first revision identifier matches the second revision identifier and when it is determined that the first document identifier does not match the second document identifier, determine whether the size of the first paragraph identifier range matches the size of the second paragraph identifier range;

when it is determined that the first revision identifier matches the second revision identifier, when it is determined that the first document identifier does not match the second document identifier and when it is determined that the size of the first paragraph identifier range matches the size of the second paragraph identifier range, determine that the first metadata and the second metadata should be merged; and when it is determined that the first metadata and the second metadata should be merged, adjust paragraph identifiers in the document based on the second metadata by:

designate the second document identifier as the first document identifier, the second document identifier also being designated as the paragraph identifier for the first paragraph in the first paragraph identifier range;

assign paragraph identifiers in the second paragraph identifier range to corresponding paragraphs in the first paragraph identifier range;

determine whether a paragraph identifier in the document from a paragraph not included in the first paragraph identifier range matches a paragraph identifier in the second paragraph identifier range; and when it is determined that a paragraph identifier in the document from a paragraph not included in the first paragraph identifier range matches a paragraph identifier in the second paragraph identifier range, assign the paragraph identifier in the document that matches a paragraph identifier in the second paragraph identifier range to a paragraph identifier in the first paragraph identifier range.

\* \* \* \* \*